US005993366A

United States Patent [19]

Kaji et al.

[11] Patent Number: 5,993,366

[45] Date of Patent: Nov. 30, 1999

[54] LOW HARDNESS CONDUCTIVE ROLL

[75] Inventors: Akihiko Kaji, Inazawa; Kenichi Ohkuwa, Inuyama; Hitoshi Yoshikawa, Komaki; Shoji Arimura, Bisai, all of Japan

[73] Assignee: Tokai Rubber Industries, Ltd., Komaki, Japan

[21] Appl. No.: 09/031,876

[22] Filed: Feb. 27, 1998

[30] Foreign Application Priority Data

Feb. 27, 1997 [JP] Japan .................................... 9-043899
Sep. 29, 1997 [JP] Japan .................................... 9-264572

[51] Int. Cl.$^6$ ........................................................ B23B 5/16

[52] U.S. Cl. ............................... 492/56; 492/59; 428/36.9

[58] Field of Search ....................... 492/56, 59; 428/36.9, 428/35.8, 328

[56] References Cited

U.S. PATENT DOCUMENTS

| | | | |
|---|---|---|---|
| 5,654,052 | 8/1997 | Visser et al. | 428/35.8 |
| 5,725,922 | 3/1998 | Nakamura et al. | 492/56 |
| 5,819,142 | 10/1998 | Murata et al. | 492/56 |
| 5,895,711 | 4/1999 | Yamaki et al. | 492/56 |
| 5,900,295 | 5/1999 | Kawada | 428/36.9 |
| 5,903,808 | 5/1999 | Takizawa et al. | 492/56 |

FOREIGN PATENT DOCUMENTS

| | | |
|---|---|---|
| 0609038 A2 | 8/1994 | European Pat. Off. . |
| 0678793A2 | 10/1995 | European Pat. Off. . |

OTHER PUBLICATIONS

Patent Abstracts of Japan, vol. 096, No. 010 (Oct. 31, 1996) & JP 08 146756 A (Jun. 7, 1996).

Patent Abstracts of Japan, vol. 098, No. 003, (Feb. 27, 1998) & JP 09 305024 A (Nov. 28, 1997).

*Primary Examiner*—I Cuda
*Attorney, Agent, or Firm*—Armstrong, Westerman, Hattori, McLeland & Naughton

[57] ABSTRACT

A low hardness conductive roll, wherein an innermost layer is formed on the peripheral surface of a shaft body, an intermediate layer is formed on the peripheral surface thereof, and further an outermost layer is formed on the peripheral surface thereof, and wherein the outermost layer is formed of a resin composition comprising the following Component (A) so that good toner electrification property and toner releasability are achieved:

$$-(Y)_k- \quad -(Z)_n- \qquad (1)$$

wherein Y denotes a linear structural portion derived from an acrylic monomer, Z denotes a structural portion derived from an acrylic monomer and also has a structural portion derived from siloxane, and k and n denote positive numbers of 1 to 3,000, respectively.

21 Claims, 2 Drawing Sheets

LOW HARDNESS CONDUCTIVE ROLL

FIELD OF THE INVENTION

The present invention relates to a low hardness conductive roll used as a developing roll of an electrophotographic copying machine, a printer or the like.

PRIOR ART

Conventionally, urethane resins are used for forming materials for conductive rolls such as developing rolls of an electrophotographic copying machine, a printer and the like. Due to their inferior conductivity, the conductivity is imparted to the urethane resin by, for example, a method of mixing a conductive material in the urethane resin. In the meantime, since it is a recent trend that electrophotographic copying machines and the like are downsized, driving forces of motors are weak. Therefore, if the hardness of the urethane resin used for the conductive roll is too high, problems nay be caused such that the roll does not rotate smoothly at start up, a click sound may occur due to stick-slip, and the like. Accordingly, conductive rolls using low hardness urethane resins have been proposed (Japanese Patent Provisional Publication Nos. 32377/93 and 187732/91).

However, since the coefficients of friction of the urethane resins used for the above-mentioned conductive rolls are relatively high, toner tends to adhere to the surfaces of the conductive rolls thermally and physically and filming of the toner tends to occur. As a result, a sufficient charge property cannot be achieved and the problem of deterioration in quality of images may occur in the course of copying. Accordingly, in order to reduce the coefficients of friction of urethane resins, there are a method of increasing the hardness of the urethane resin, a method of increasing the crystallinity of the urethane resin, and the like. However, if the hardness of the urethane resin is increased, the requirement of low hardness is not satisfied and, as described above, smooth revolution of the roll at start up and the like may be impeded. Meanwhile, if the crystallinity of the urethane resin is increased, the solubility in the usual solvents is decreased. Consequently, problems may be caused such that the kinds of solvents are limited to solvents having high volatility and the like, application of the urethane resin cannot be conducted, and the like. Thus, processability in manufacturing the conductive rolls will deteriorate.

Accordingly, in order to solve the above problems by reducing the coefficients of friction of the urethane resin without increasing the hardness and crystallinity thereof, the inventors of the present invention have already proposed a conductive roll whose outermost layer material comprises a resin composition in which a siliconegraftacrylic polymer is contained in a thermoplastic urethane resin (Japanese Patent Application No. 121614/96).

Regarding the conductive roll discussed in Japanese Patent Application No. 121614/96, the outermost layer is formed of a resin composition in which a siliconegraftacrylic polymer having a strong positive charge property is dispersed in a thermoplastic urethane resin having a weak positive charge property. However, the compatibility of the siliconegraftacrylic polymer with the thermoplastic urethane resin is inferior. Therefore, even if the siliconegraftacrylic polymer having a strong positive charge property exists on the surface of the outermost layer, such existence is partial so that problems may be caused: the toner charge property may be insufficient and the toner scattering may be great, and filming of the toner tends to occur due to insufficient toner releasability. Thus, further improvement is required.

SUMMARY OF THE INVENTION

The present invention was made under such circumstances. The present invention aims to provide a low hardness conductive roll having both good toner charge property and toner releasability.

To accomplish the above aim, it is an aspect of the present invention to provide a low hardness conductive roll having a structure in which at least one layer is formed on a peripheral surface of a shaft body, wherein an outermost layer of the at least one layer is formed of a resin composition containing the following Component (A):

(A) a siliconegraftacrylic polymer composed of a repetitive unit represented by the following general formula (1), wherein the glass-transition temperature of an acrylic polymer portion other than a structural portion derived from siloxane is set in the range from −35 to 30° C.:

$$-(Y)_k- \quad -(Z)_n- \qquad (1)$$

wherein Y denotes a linear structural portion derived from an acrylic monomer, Z denotes a structural portion derived from an acrylic monomer and also has a structural portion derived from siloxane, k denotes a positive number of 1 to 3,000, and n denotes a positive number of 1 to 3,000.

For the low hardness conductive roll according to the present invention, "an outermost layer of at least one layer" means the layer in the case where there is only one layer, and means, literally, the outermost layer in the case where there are two or more layers. "A siliconegraftacrylic polymer" of Component (A) in the above general formula (1) means a compound in which, a $(Z)_n$ portion and a $(Y)_k$ portion are copolymerized so that a silicone constituent is grafted to an acrylic polymer as a trunk.

The inventors of the present invention compiled a series of studies in order to obtain a low hardness conductive roll having both good toner charge property and toner releasability. In the course of the studies, the inventors aimed at a resin composition forming an outermost layer of the conductive roll, and found that sufficient toner charge property and toner releasability cannot be imparted in the case where a conventional resin composition whose main constituent is an urethane resin is used. As a result of further studies, the inventors conceived the usage of a resin composition whose main constituent is a siliconegraftacrylic polymer in place of the conventional resin composition whose main constituent is an urethane resin, and compiled a series of studies on the structure and properties of the siliconegraftacrylic polymer. Consequently, they arrived at a siliconegraftacrylic polymer (Component (A)) of a specific structure having a specific glass-transition temperature, and found that, when the outermost layer of the conductive roll is formed of a resin composition having the siliconegraftacrylic polymer (Component (A)), a low hardness conductive roll having both good toner charge property and toner releasability may be obtained. The inventors thus reached the present invention.

Further, the inventors found that, when the number average molecular weight of the siliconegraftacrylic polymer (Component (A)) is set in the range from 10,000 to 300,000, a low hardness conductive roll having excellent flexibility and a low coefficient of friction is provided. The number average molecular weight in the present invention is a number average molecular weight calculated in terms of polystyrene according to the gel permeation chromatography (GPC) method.

Furthermore, the inventors found that, when a resin composition containing a conductive agent in addition to the siliconegraftacrylic polymer (Component (A)), the conductivity of the low hardness conductive roll is further improved.

Still furthermore, the inventors found that, in the case of a low hardness conductive roll in a three-layer structure having an innermost layer, an intermediate layer and an outermost layer in which a specific resin composition containing Component (A) is used for the material of the outermost layer, while a material whose main constituent is a specific hydrogenated acrylonitrile-butadiene rubber (Component (B)) is used for the material of the intermediate layer, adhesive strength between each layer of the innermost layer, the intermediate layer and the outermost layer is improved, in addition to the above-described impartation of good toner charge property and toner releasability so that the occurrence of peeling, breaks and the like may be prevented and therefore good images may be produced. The inventors also found that, when a material whose main constituent is a silicone rubber is used for the material forming the innermost layer, low hardness with less compression set may be achieved. In the meantime, in the present invention, "the main constituent" in the material forming the intermediate layer and the material forming the innermost layer includes the case where the material consists only of the main constituent, respectively.

Embodiments of the present invention will hereinafter be described in detail.

Figure 1:
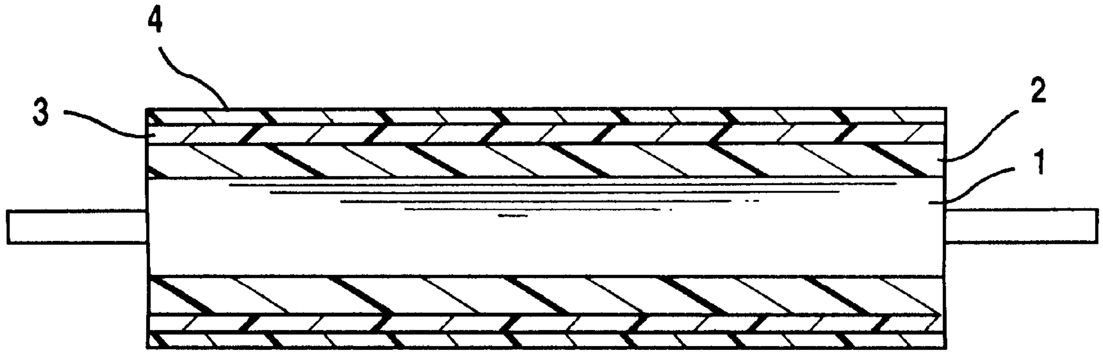
FIG. 1 is a cross-sectional view showing one embodiment of a low hardness conductive roll according to the present invention.

FIG. 1 shows one embodiment of a low hardness conductive roll according to the present invention. This low hardness conductive roll comprises an innermost layer 2 formed on the peripheral surface of a shaft body 1, an intermediate layer 3 formed on the peripheral surface thereof, and an outermost layer 4 further formed on the peripheral surface thereof. In addition, the main characteristic of the low hardness conductive roll according to the present invention is that the outermost layer 4 is formed of a specific resin containing a specific siliconegraftacrylic polymer (Component (A)).

Regarding the shaft body 1, there are no specific limitations. It may be, for example, a core made of a metal solid body, a metal hollow cylindrical body and the like. Materials thereof include stainless steel, aluminum, iron plated steel and the like. An adhesive, a primer or the like may, if desired, be applied onto the shaft body. Conductivity may, if desired, be imparted to such additive, primer and the like.

Regarding materials for forming the innermost layer 2, formed on the peripheral surface of the shaft body 1, there are no specific limitations. Specific examples may be a silicone rubber, an ethylene-propylene-diene rubber (EPDM), a styrene-butadiene rubber (SBR), a polyurethane elastomer and the like. Among those, silicone rubber is particularly preferable in view of low hardness with less compression set. In the case where the silicone rubber is used as the material to form the innermost layer 2, a step of activating, the surface of the silicone rubber by corona discharge, plasma discharge or the like, and a subsequent step of applying a primer may be conducted.

A conductive agent may appropriately be added to the material for forming the innermost layer 2. Such conductive agents include carbon black, graphite, potassium titanate, iron oxide, c-$TiO_2$, c-ZnO, c-$SnO_2$, ion conductive agents (a quaternary ammonium salt, borate, a surfactant and the like), and the like. The above "c-" means conductive.

Regarding materials for forming the intermediate layer 3 formed on the periphery of the innermost layer 2, there are no specific limitations. Specific examples may be an acrylonitrile-butadiene rubber (nitrile rubber) (hereinafter abbreviated to "NBR"), a hydrogenated acrylonitrile-butadiene rubber (hydrogenated nitrile rubber) (hereinafter abbreviated to "H-NBR"), a polyurethane elastomer, polychloroprene (CR), a natural rubber, a butadiene rubber (BR), a butyl rubber (IIR) and the like. Among those, H-NBR is particularly preferable in view of its adhesive property and the stability of a coating liquid.

As to the above-mentioned H-NBR, it is preferable that the amount of acrylonitrile is set in the range from 40 to 50% and also the iodine value is set in the range from 18 to 56 mg/100 mg. More preferably, the acrylonitrile amount is set in the range from 45 to 50% and also the iodine value is set in the range from 18 to 45 mg/100 mg. Such H-NBR may be obtained, for example, in the following manner. First, NBR as a raw material is prepared by emulsion polymerization between acrylonitrile and butadiene. The material NBR is dissolved into a solvent of acetone, methyl ethyl ketone, methyl isobutyl ketone, cyclohexane or the like, and subjected to a hydrogenation reaction in the presence of noble metal catalysts such as Rh, Pd, Pt and the like (that is, hydrogenation treatment is conducted on NBR), so that the solvent is removed. Thus, the targeted H-NBR is obtained, The amount of acrylonitrile is adjusted depending on material NBR and the iodine value (the hydrogen amount to be added) is adjusted depending on the hydrogen concentration and the like to be reacted with.

Conductive agents, vulcanizing agents such as sulfur and the like, vulcanization accelerators such as guanidine, thiazole, sulfenamide, dithiocarbamic acid, thiuram and the like, stearic acid, zinc white (ZnO), softeners and the like may appropriately be added to the material forming the intermediate layer 3. As to the conductive agents, the same conductive agents as above may be used.

The outermost layer 4 formed on the periphery of the intermediate layer 3 is formed of a specific resin composition containing specific siliconegraftacrylic polymer (Component (A)).

The siliconegraftacrylic polymer (Component (A)) has a structure represented in the following general formula (1):

$$-(Y)_k- \qquad -(Z)_n- \tag{1}$$

wherein Y denotes a linear structural portion derived from an acrylic monomer, Z denotes a structural portion derived from an acrylic monomer and also has a structural portion derived from siloxane, k denotes a positive number of 1 to 3,000, and n denotes a positive number of 1 to 3,000.

In the above general formula (1), a repetitive number k is a positive number of 1 to 3,000, preferably 1 to 300. A repetitive number n is a positive number of 1 to 3,000, preferably 1 to 300.

In the above general formula (1), Y denotes a linear structural portion derived from an acrylic monomer, Specifically, the acrylic monomers include radical polymerization monomers such as acrylic acid, methyl acrylate, ethyl acrylate, octyl acrylate, dodecyl acrylate, 2-ethyl hexyl acrylate, propyl acrylate, n-butyl acrylate, isobutyl acrylate, sec-butyl acrylate, tert-butyl acrylate, 2,2-dimethylpropyl acrylate, cyclohexyl acrylate, 2-tert-butylphenyl acrylate, 2-naphtyl acrylate, phenyl acrylate, 4-methoxyphenyl acrylate, 2-methoxycarbonylphenyl acrylate, 2-ethoxycarbonylphenyl acrylate, 2-chlorophenyl acrylate, 4-chlorophenyl acrylate, benzyl acrylate, 2-cyanobenzyl acrylate, 4-cyanophenyl acrylate, p-tolyl acrylate, isononyl acrylate, 2-hydroxyethyl acrylate, 2-hydroxypropyl acrylate, 2-hydroxybutyl acrylate, 2-cyanoethyl acrylate, 3-oxabutyl acrylate, methacrylic acid, methyl methacrylate, ethyl methacrylate, octyl methacrylate, dodecyl methacrylate, 2-ethyl hexyl methacrylate, propyl methacrylate, n-butyl methacrylate, isobutyl methacrylate, sec-butyl methacrylate, tert-butyl methacrylate, 2,2-dimethylpropyl methacrylate, cyclohexyl methacrylate, 2-tert-butylphenyl methacrylate, 2-naphtyl methacrylate, phenyl methacrylate, 4-methoxyphenyl methacrylate, 2-methoxycarbonylphenyl methacrylate, 2-ethoxycarbonylphenyl methacrylate, 2-chlorophenyl methacrylate, 4-chlorophenyl methacrylate, benzyl methacrylate, 2-cyanobenzyl methacrylate, 4-cyanophenyl methacrylate, p-tolyl methacrylate, isononyl methacrylate, 2-hydroxyethyl methacrylate, 2-hydroxypropyl methacrylate, 2-hydroxybutyl methacrylate, 2-cyanoethyl methacrylate, 3-oxabutyl methacrylate, γ-methacryloyloxypropyltrimethoxysilane, acrylamide, butylacrylamide, N,N-dimethylacrylamide, piperidylacrylamide, methacrylamide, 4-carboxyphenylmethacrylamide, 4-methoxycarboxyphenylmethacrylamide, methylchloroacrylate, ethyl-α-chloroacrylate, propyl-α-chloroacrylate, isopropyl-α-chloroacrylate, methyl-α-fluoroacrylate, butyl-α-butoxycarbonylmethacrylate, butyl-α-cyanoacrylate, methyl-α-phenylacrylate, isobornyl acrylate, isobornyl methacrylate, diethylaminoethylmethacrylate, and the like. The linear structural portion represented as Y is formed by polymerizing one kind of the above acrylic monomers or copolymerizing two or more kinds of the above acrylic monomers.

In the above general formula (1), Z denotes a structural portion derived from an acrylic monomer and also has a structural portion derived from siloxane. Z may be derived from the following general formula (3) or (4):

(3)

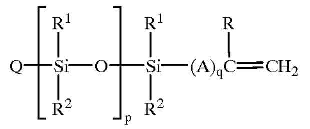

wherein $R^1$ and $R^2$, which may be the same or different, denote an alkyl group or a phenyl group with 1 to 20 carbon atoms, and, in addition, they may be the same or different per repetitive unit p, p is a positive number of 3 to 520, A denotes a divalent connecting group, preferably $—CH_2CH(OH)CH_2OCO—$, $—(CH_2)n'NHCH_2CH(OH)CH_2OCO—$, $—(CH_2)n'OCO—$, $—(CH_2)n'O(CH_2)m'OCO—$ or $—OCH_2CH(OH)CH_2OCO—$, n' denoting a positive number of 2 to 6 and m' denoting a positive number of 2 to 6, q denotes 0 or 1, R denotes a hydrogen atom or an alkyl group, and Q denotes a methyl group, a phenyl group or $CH_2═CR—A_q—$, R, A and q being the same as above, and (4)

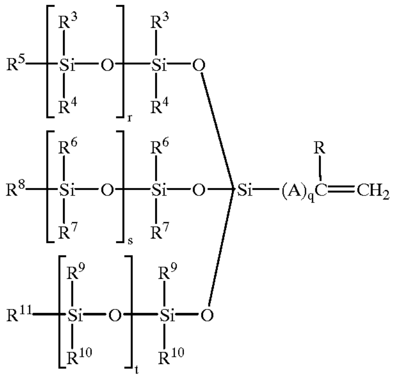

wherein $R^3$ to $R^{11}$, which may be the same or different, denote an alkyl group or a phenyl group with 1 to 20 carbon atoms, and, in addition, they may be the same or different per repetitive unit r, r is a positive number of 1 to 200, per repetitive unit s, s is a positive number of 1 to 200, and/or per repetitive unit t, t is a positive number of 1 to 200, and A, q and R are the same as those in the general formula (3).

Preferable examples of the general formula (3) or (4) may be the following structural formulae (a) to (r):

(a)

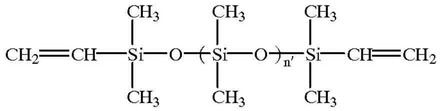

-continued
(b)
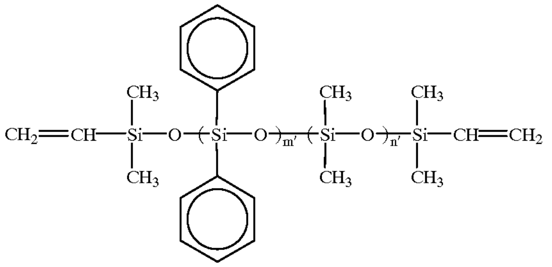
(c)
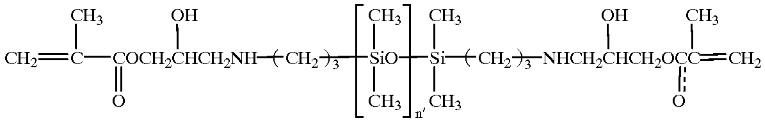
(d)
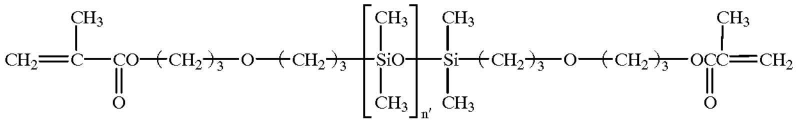
(e)
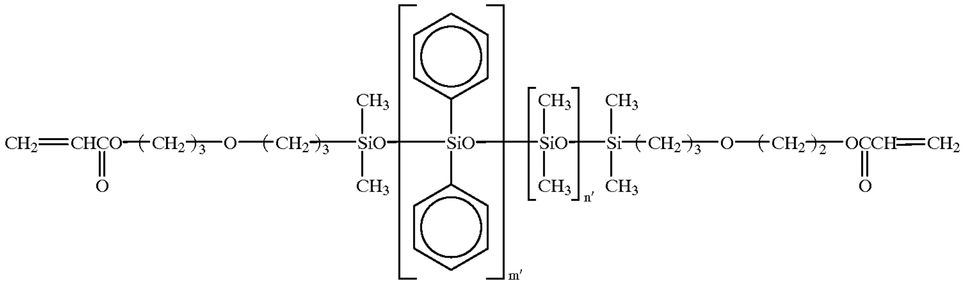
(f)
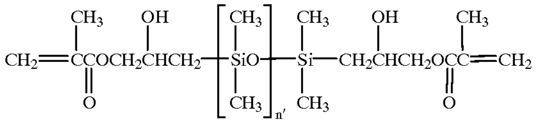
(g)
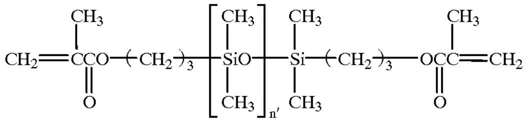
(h)
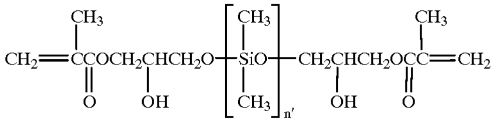
(i)
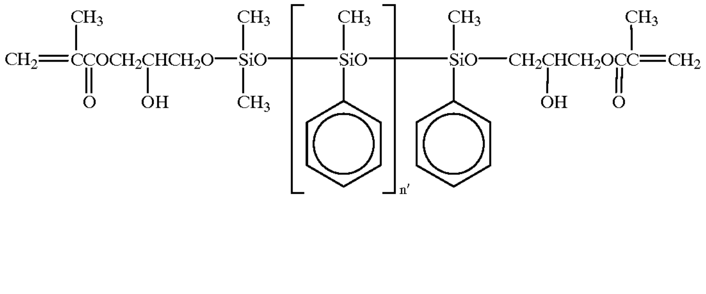

-continued
(j)
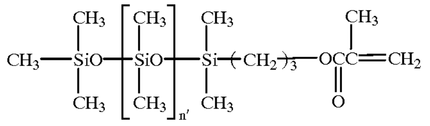
(k)
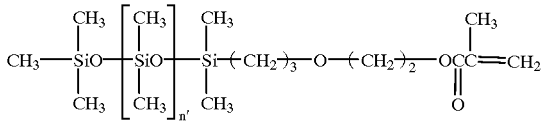
(l)
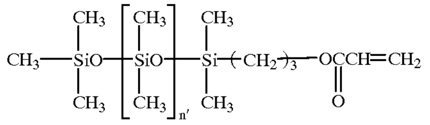
(m)
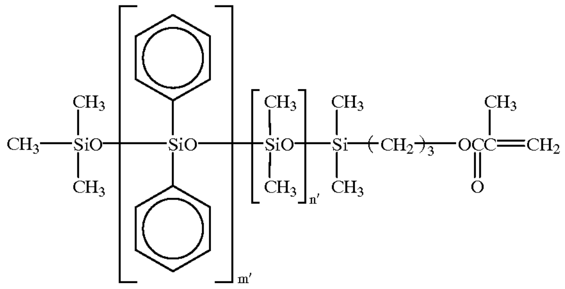
(n)
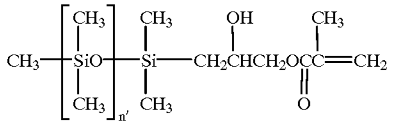
(o)
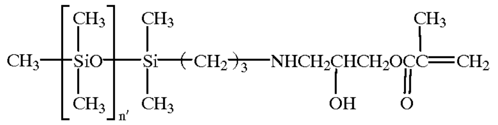
(p)
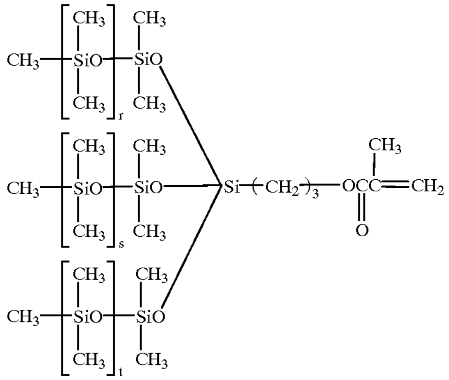

[In the formula (p), r, s and t are the same as those in the formula (4).]

(q)

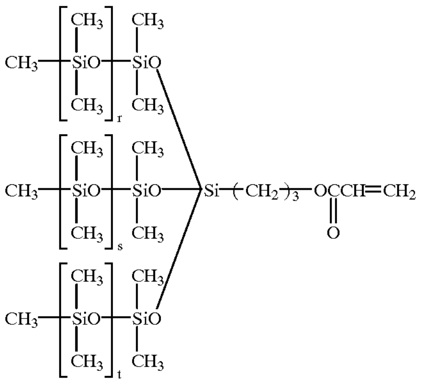

(r)

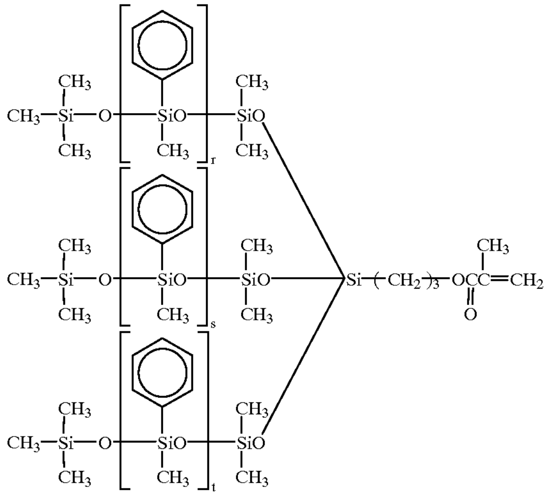

[In the formulae (q) and (r), r, s and t are the same as those in the formula (4).]

For the siliconegraftacrylic polymer (Component (A)) having a structure represented by the general formula (1), the glass-transition temperature of the acrylic polymer portion (a principal chain) other than the structural portion (a side chain) derived from siloxane needs to be in the range from −35 to 30° C., preferably −30 to 0° C. That is, when the glass-transition temperature of the acrylic polymer portion (a principal chain) is below −35° C., problems are caused: filming of toner occurs due to an increase in terms of adhesion and coefficient of friction and copied images deteriorate. If the glass-transition temperature exceeds 30° C., problems are caused in that the roll becomes so hard that it does not revolve smoothly at start up, a clicking sound occurs and the like. In addition, there is a problem that traces tend to remain on the roll when the roll is pressure-contacted with other parts.

The glass-transition temperature of the acrylic polymer portion (a principal chain) other than the structural portion (a side chain) derived from siloxane may be determined, for example, in the following manner. Namely, the weight ratio of each acrylic polymer is determined according to the following Fox formula so that the glass-transition temperature of the acrylic polymer (a principal chain) falls within the range from −35 to 30° C.:

$$1/Tg=(W_1/Tg_1)+(W_2/Tg_2)+ \ldots +(W_m/Tg_m) \quad W_1+W_2+ \ldots +W_m=1$$

wherein Tg denotes the glass-transition temperature of the acrylic polymer portion, $Tg_1$, $Tg_2$, . . . and $Tg_m$ denote glass-transition temperatures of the acrylic monomers, respectively, and $W_1$, $W_2$, . . . and $W_m$ denote weight ratios of the acrylic monomers, respectively.

The glass-transition temperature (Tg) may be measured by DSC (differential scanning calorimetry) or by tan δ peaks of dynamic viscoelasticity.

The number average molecular weight of the siliconegraftacrylic polymer (Component (A)) having a structure represented by the general formula (1) is preferably set in the range from 10,000 to 300,000, more preferably 30,000 to 100,000. That is, in the case where the number average molecular weight of the siliconegraftacrylic polymer (Component (A)) is below 10,000, there is a tendency of deterioration in hardness of the outermost layer, while, in the case where the number average molecular weight is over 300,000, formation of the outermost layer becomes difficult.

The number average molecular weight of the $(Z)_n$ portion of the siliconegraftacrylic polymer (Component (A)) having a structure represented by the general formula (1) is preferably set in the range from 260 to 100,000, more preferably 2,000 to 50,000. That is, in the case where the number average molecular weight of the $(Z)_n$ portion is below 260, there are less effects of silicone in terms of flexibility, low coefficient of friction, mold releasability and the like, while, in the case where the number average molecular weight is over 100,000, tackiness occurs.

The percentage content of the $(Z)_n$ portion is preferably set in the range from 5 to 60% by weight of the total weight of the siliconegraftacrylic polymer (Component (A)), That is, in the case where the percentage content of the $(Z)_n$ portion is below 5% by weight, there are less effects of silicone in terms of flexibility, low coefficient of friction, mold releasability and the like, while, in the case of over 60% by weight, tackiness unique to silicone occurs.

The above-described specific siliconegraftacrylic polymer (Component (A)) may be produced in the following manner. Namely, such production is performed by radical-copolymerizing the $(Y)_k$ portion and the $(Z)_n$ portion in the presence of an azo-type polymerization initiator. This type of polymerization is preferably conducted with a solution polymerization method using a solvent, a bulk polymerization method, an emulsion polymerization method or the like. The solution polymerization method is particularly preferable.

Specific examples of the azo-type polymerization initiators may be azobisisobutyronitrile (AIBN), azobis-4-cyanovaleric acid, azobis(2,4-dimethylvaleronitrile), azobis (4-methoxy-2,4-dimethylvaleronitrile), dimethyl-2,2'-azobis(isobutyrate), azobis-1-cyclohexacarbonitrile and the like. Particularly, AIBN is preferable.

The polymerization temperature in the case of the above radical polymerization is preferably 50 to 150° C., more preferably 60 to 100° C. In the meantime, the polymerization time is preferably 3 to 100 hours, more preferably 5 to 10 hours.

The specific siliconegraftacrylic polymer (Component (A)) according to the present invention has the structure represented by the above-described general formula (1). However, the siliconegraftacrylic polymer may have a structure which is represented by the following general formula (2) in which a linear structural portion (an $(X)_m$ portion) derived from another acrylic monomer is further connected to the structure of the general formula (1).

$$(Y)_k(X)_m(Z)_n \quad (2)$$

wherein Y and X, which are different, denote linear structural portions derived from acrylic monomers, Z denotes a structural portion derived from an acrylic monomer and also has a structural portion derived from siloxane, k denotes a positive number of 1 to 3,000, m denotes a positive number of 1 to 10,000, and n denotes a positive number of 1 to 3,000.

In the above general formula (2), X is a linear structural portion derived from an acrylic monomer. The acrylic monomers may be the same acrylic monomers cited in the general formula (1). Y and X should be different from each other. The repetitive number m is a positive number of 1 to 10,000, and preferably 100 to 3,000.

Regarding the specific resin composition forming the outermost layer 4 of the low hardness conductive roll according to the present invention, the above-mentioned conductive agents may appropriately be added further, in addition to the specific siliconegraftacrylic polymer (Component (A)). Moreover, one or more charge-controlling agents may appropriately be added. The charge-controlling agents may be quaternary ammonium salt, borate, an azine (nigrosine) type compound, an azo compound, a hydroxynaphthoic acid metal complex, surfactants (anionic type, cationic type and nonionic type) and the like. If necessary, a stabilizer, an ultraviolet ray absorbent, an antistatic agent, a reinforcing agent, a charge-controlling agent, a lubricant, a mold-releasing agent, colorant, pigment, a flame retardant, oil and the like may appropriately be added to the specific resin composition. Further, the specific resin composition may be cross-linked by a hardener. Example hardeners may be an isocyanate group-containing substance and hardeners containing an amino group, an epoxy group, a carboxyl group, —SH group and the like.

The specific resin composition forming the outermost layer 4 of the low hardness conductive roll according to the present invention may be produced, for example, in the following manner. That is, first, the specific siliconegraftacrylic polymers (Component (A)) are prepared by the manner described hereinbefore, and are dissolved in an organic solvent. Then, the conductive agent, the charge-controlling agent and/or the like are, if necessary, added thereto, and a coating liquid for coating is produced by mixing the resultant mixture with a sand mill and the like. Alternatively, the coating liquid for coating may be produced by mixing the siliconegraftacrylic polymer (Component (A)), the conductive agent and the like with a double screw keader or extruder and the like and dissolving the mixture in the organic solvent. Thus, the targeted specific resin composition (a coating liquid) may be obtained. Specific examples of the organic solvents may be methyl ethyl ketone, toluene, tetrahydrofuran, dimethylformamide, dimethyl sulfoxide, methyl isobutyl ketone, cyclohexane, methanol, isopropyl alcohol and the like. They are used solely or in combination.

The low hardness conductive roll according to the present invention may be produced, for example, in the following manner. That is, first, components for forming the innermost layer 2 are kneaded with a kneading machine such as a kneader and the like so as to prepare the material for forming the innermost layer 2. Compounds for forming the intermediate layer 3 are kneaded with a kneading machine such as a roll and the organic solvent is added thereto. The resultant mixture is mixed and stirred so as to prepare the material (a coating liquid) for forming the intermediate layer 3. The specific resin composition (a coating liquid) which is the material for forming the outermost layer 4 is prepared in accordance with the manner described hereinbefore.

Figure 2:
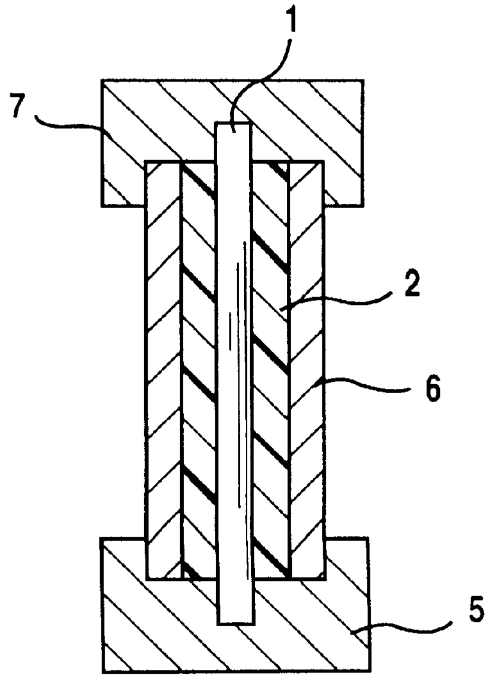
FIG. 2 is a cross-sectional view showing one embodiment of a method for preparing a low hardness conductive roll according to the present invention.

Then, as shown in FIG. 2, a shaft body 1 is prepared and, an adhesive, a primer or the like is, if necessary, applied thereon. Thereafter, the shaft body 1 is set inside a cylindrical form 6 which is externally covered with a bottom cap 5. After casting the material for forming the innermost layer 2, the cylindrical form 6 is externally covered with a top cap 7. The whole roll form then is heated so as to vulcanize the material of the innermost layer 2 (at, for example, 150 to 220° C. for 30 minutes), to form the innermost layer 2. Subsequently, the shaft body on which the innermost layer 2 is formed is removed from the form, and the reaction is, if necessary, finalized (at, for example, 200° C. for 4 hours). A corona discharge treatment is, if necessary, conducted on the surface of the roll. A coupling agent is, if necessary, applied on the roll surface. Then, after applying a coating liquid, the material for forming the intermediate layer 3, on the periphery of the innermost layer 2, or, alternatively, impregnating the roll on which the innermost layer 2 is already formed into the coating liquid and taking the roll therefrom, and, subsequently, conducting drying and heating treatments, thereby, the intermediate layer 3 is formed on the periphery of the innermost layer 2. After applying a specific resin composition (a coating liquid), the material of the outermost layer 4, on the periphery of the intermediate layer 3, or, alternatively, impregnating the roll on which the intermediate layer 3 is already formed into the coating liquid and taking the roll therefrom, and, subsequently, conducting drying and heating treatments, the outermost layer 4 is formed on the periphery of the intermediate layer 3. There are no limitations as to the ways of applying the coating liquids. They may be a dipping method, a spray coating method, a roll coat method and the like which have conventionally been known. In this way, the conductive roll may be prepared, in which the innermost layer 2 is formed on the peripheral surface of the shaft body 1, the intermediate layer 3 is formed on the periphery thereof, and the outermost layer 4 is formed on the periphery thereof.

With respect to the low hardness conductive roll according to the present invention, the thickness of each layer is appropriately determined depending on the use of the conductive roll. For instance, in the case of a developing roll, the thickness of the innermost layer in general is preferably in the range from 0.5 to 10 mm, more preferably 3 to 6 mm. The thickness of the intermediate layer in general is preferably in the range from 1 to 90 $\mu$m, more preferably 3 to 15 $\mu$m. The thickness of the outermost layer in general is preferably in the range from 3 to 100 $\mu$m, more preferably 5 to 50 $\mu$m.

Regarding the hardness of the low hardness conductive roll according to the present invention, the measured value according to Japanese Industrial Standard (JIS A) in terms of hardness is preferably not more than 70 (Hs: JIS A), more preferably not more than 60 (Hs: JIS A).

The low hardness conductive roll according to the present invention is preferable for use as a developing roll, however, there are no limitations. A transferring roll, a charging roll and the like may be another applications. As an example of the low hardness conductive roll according to the present invention, FIG. 1 shows the roll having a three-layer structure. However, the layers formed on the periphery of the shaft body 1 are not necessarily three layers and an appropriate number of layers are formed depending on the application of the roll and the like. In all cases, however, the outermost layer (which is, in the case of a single layer, the layer itself) should be formed of the specific resin composition.

The present invention will hereinafter be explained by reference to the Examples and the Comparative Examples.

Prior to the Examples and the Comparative Examples, siliconegraftacrylic polymers A to K composed of the following repetitive units were prepared in the manner described hereinafter.

[Siliconegraftacrylic polymer A]

$-(Y_1)_{k1}-\quad-(Y_2)_{k2}-\quad-(Z)_n-$

| | |
|---|---|
| $Y_1$ = isobutyl acrylate | $k_1 = 91$ |
| $Y_2$ = n-butyl methacrylate | $k_2 = 115$ |
| Z = | $n = 2.6$ |

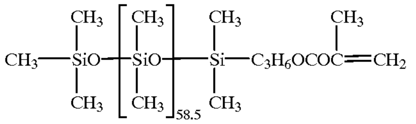

[Siliconegraftacrylic polymer B]

$-(Y_1)_{k1}-\quad-(Y_2)_{k2}-\quad-(Z)_n-$

| | |
|---|---|
| $Y_1$ = isobutyl acrylate | $k_1 = 53$ |
| $Y_2$ = ethyl methacrylate | $k_2 = 126$ |
| Z = | $n = 2$ |

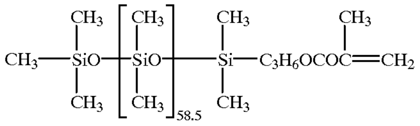

[Siliconegraftacrylic polymer C]

$-(Y_1)_{k1}-\quad-(Y_2)_{k2}-\quad-(X)_m-\quad-(Z)_n-$

| | |
|---|---|
| $Y_1$ = isobutyl acrylate | $k_1 = 67$ |
| $Y_2$ = n-butyl methacrylate | $k_2 = 48$ |
| X = 2-hydroxyethyl methacrylate | $m = 16$ |
| Z = | $n = 3.8$ |

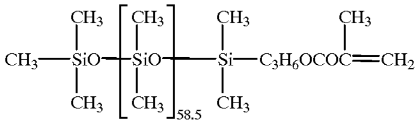

[Siliconegraftacrylic polymer D]

$-(Y_1)_{k1}-\quad-(Y_2)_{k2}-\quad-(X)_m-\quad-(Z)_n-$

| | |
|---|---|
| $Y_1$ = n-butyl acrylate | $k_1 = 118$ |
| $Y_2$ = n-butyl methacrylate | $k_2 = 130$ |
| X = 2-hydroxyethyl methacrylate | $m = 19$ |
| Z = | $n = 1$ |

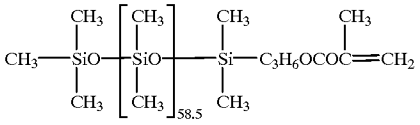

[Siliconegraftacrylic polymer E]

$-(Y_1)_{k1}-\quad-(Y_2)_{k2}-\quad-(X)_m-\quad-(Z)_n-$

| | |
|---|---|
| $Y_1$ = n-butyl acrylate | $k_1 = 55$ |
| $Y_2$ = n-butyl methacrylate | $k_2 = 46$ |
| X = 2-hydroxyethyl methacrylate | $m = 19$ |
| Z = | $n = 5.2$ |

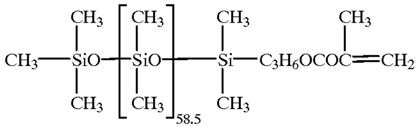

[Siliconegraftacrylic polymer F]

$-(Y_1)_{k1}-\quad-(Y_2)_{k2}-\quad-(X)_m-\quad-(Z)_n-$

| | |
|---|---|
| $Y_1$ = n-butyl acrylate | $k_1 = 172$ |
| $Y_2$ = n-butyl methacrylate | $k_2 = 69$ |
| X = 2-hydroxyethyl methacrylate | $m = 23$ |
| Z = | $n = 3.3$ |

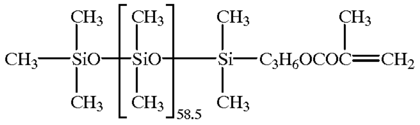

-continued

[Siliconegraftacrylic polymer G]

$-(Y_1)_{k1}-\quad-(Y_2)_{k2}-\quad-(X)_m-\quad-(Z)_n-$

| | |
|---|---|
| $Y_1$ = n-butyl acrylate | $k_1 = 153$ |
| $Y_2$ = n-butyl methacrylate | $k_2 = 41$ |
| X = 2-hydroxyethyl methacrylate | $m = 19$ |
| Z = | $n = 2.6$ |

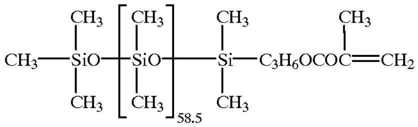

[Siliconegraftacrylic polymer H]

$-(Y_1)_{k1}-\quad-(Y_2)_{k2}-\quad-(X)_m-\quad-(Z)_n-$

| | |
|---|---|
| $Y_1$ = n-butyl acrylate | $k_1 = 115$ |
| $Y_2$ = n-butyl methacrylate | $k_2 = 121$ |
| X = 2-hydroxyethyl methacrylate | $m = 23$ |
| Z = | $n = 2$ |

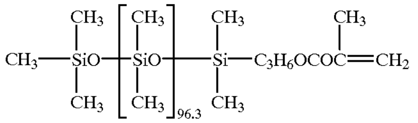

[Siliconegraftacrylic polymer I]

$-(Y)_k-\quad-(Z)_n-$

| | |
|---|---|
| Y = methyl methacrylate | $k = 565$ |
| Z = | $n = 10$ |

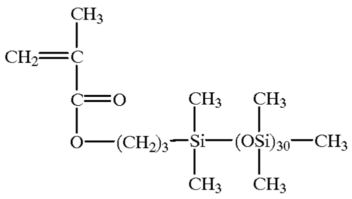

[Siliconegraftacrylic polymer J]

$-(Y_1)_{k1}-\quad-(Y_2)_{k2}-\quad-(X)_m-\quad-(Z)_n-$

| | |
|---|---|
| $Y_1$ = n-butyl acrylate | $k_1 = 171$ |
| $Y_2$ = n-butyl methacrylate | $k_2 = 26$ |
| X = 2-hydroxyethyl methacrylate | $m = 19$ |
| Z = | $n = 2.6$ |

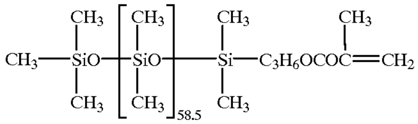

[Siliconegraftacrylic polymer K]

$-(Y_1)_{k1}-\quad-(Y_2)_{k2}-\quad-(X)_m-\quad-(Z)_n-$

| | |
|---|---|
| $Y_1$ = isobutyl acrylate | $k_1 = 74$ |
| $Y_2$ = ethyl methacrylate | $k_2 = 196$ |
| X = 2-hydroxyethyl methacrylate | $m = 23$ |
| Z = | $n = 3.3$ |

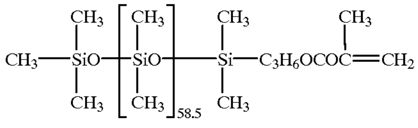

EXAMPLES 1–8 AND COMPARATIVE EXAMPLES 1–3

First, the components shown in the following Tables 1–3 were mixed in the ratios shown in the tables so as to prepare materials for forming each of the layers according to the manners described hereinbefore. A core (having a diameter of 10 mm and made of SUS 304), which was a shaft body, was prepared, and an innermost layer was formed on the core in accordance with the above-described manner. Subsequently, the surface of the roll was subjected to a corona discharge treatment. The application of a coupling agent was performed in Examples 1–8 and Comparative Examples 1–3. Then, an intermediate layer and an outermost layer were formed on the periphery of the innermost layer, in the order referred, so as to produce a targeted conductive roll having a three-layer structure, The following Tables 1–3 show the hardness, electric resistance and thickness of each layer, and the glass-transition temperature (the acrylic polymer portion exclusive of the structural portion derived from siloxane), number average molecular weight and percentage content of the $(Z)_n$ portion of each siliconegraftacrylic polymer. The electric resistance was measured according to JIS K 6301.

TABLE 1

| | Examples | | | |
|---|---|---|---|---|
| | 1 | 2 | 3 | 4 |
| Innermost layer | | | | |
| Conductive silicone rubber *1 | 100 parts | 100 parts | 100 parts | 100 parts |
| Hardness (Hs: JIS A) | 35 | 35 | 35 | 35 |
| Electric resistance (Ω) | $8 \times 10^4$ | $8 \times 10^4$ | $8 \times 10^4$ | $8 \times 10^4$ |
| Thickness (mm) | 5 | 5 | 5 | 5 |
| Intermediate layer | | | | |
| H-NBR | 100 parts | 100 parts | 100 parts | 100 parts |
| Acrylonitrile amount (%) | 50 | 50 | 50 | 50 |
| Iodine value (mg/100 mg) | 23 | 23 | 23 | 23 |
| Stearic acid | 0.5 part | 0.5 part | 0.5 part | 0.5 part |
| Zinc white (ZnO) | 5 parts | 5 parts | 5 parts | 5 parts |
| Denka Black HS-100 *2 | 40 parts | 40 parts | 40 parts | 40 parts |
| Vulcanization accelerator BZ | 1 part | 1 part | 1 part | 1 part |
| Vulcanization accelerator CZ | 2 parts | 2 parts | 2 parts | 2 parts |
| Sulfur | 1 part | 1 part | 1 part | 1 part |
| Hardness (Hs: JIS A) | 73 | 73 | 73 | 73 |
| Electric resistance (Ω) | $8 \times 10^4$ | $8 \times 10^4$ | $8 \times 10^4$ | $8 \times 10^4$ |
| Thickness (μm) | 10 | 10 | 10 | 10 |
| Outermost layer | | | | |
| Siliconegraftacrylic polymer | 100 parts | 100 parts | 100 parts | 100 parts |
| Kind | A | B | C | D |
| Glass-transition temperature | 0° C. | 30° C. | 0° C. | −15° C. |
| Number average molecular weight | 40,000 | 30,000 | 35,000 | 40,000 |
| $(Z)_n$ portion content | 30% | 30% | 50% | 11% |
| Denka Black HS-100 *2 | 10 parts | 10 parts | 10 parts | 10 parts |
| Hardener *3 | 10 parts | 10 parts | 20 parts | 20 parts |
| Electric resistance (Ω) | $1 \times 10^6$ | $2 \times 10^6$ | $5 \times 10^6$ | $3 \times 10^6$ |
| Thickness (μm) | 15 | 15 | 15 | 15 |

*1 X34-264 A/B manufactured by Shin-Etsu Chemical Co., Ltd.
*2 Manufactured by Denki Kagaku Kabushiki Kaisya.
*3 Burnock DN955 manufactured by Dainippon Ink and Chemicals Incorporated.

TABLE 2

| | Examples | | | |
|---|---|---|---|---|
| | 5 | 6 | 7 | 8 |
| Innermost layer | | | | |
| Conductive silicone rubber *1 | 100 parts | 100 parts | 100 parts | 100 parts |
| Hardness (Hs: JIS A) | 35 | 35 | 35 | 35 |
| Electric resistance (Ω) | $8 \times 10^4$ | $8 \times 10^4$ | $8 \times 10^4$ | $8 \times 10^4$ |
| Thickness (mm) | 5 | 5 | 5 | 5 |

TABLE 2-continued

| | Examples | | | |
|---|---|---|---|---|
| | 5 | 6 | 7 | 8 |
| Intermediate layer | | | | |
| H-NBR | 100 parts | 100 parts | 100 parts | 100 parts |
| Acrylonitrile amount (%) | 50 | 50 | 50 | 50 |
| Iodine value (mg/100 mg) | 23 | 23 | 23 | 23 |
| Stearic acid | 0.5 part | 0.5 part | 0.5 part | 0.5 part |
| Zinc white (ZnO) | 5 parts | 5 parts | 5 parts | 5 parts |
| Denka Black HS-100 *2 | 40 parts | 40 parts | 40 parts | 40 parts |
| Vulcanization accelerator BZ | 1 part | 1 part | 1 part | 1 part |
| Vulcanization accelerator CZ | 2 parts | 2 parts | 2 parts | 2 parts |
| Sulfur | 1 part | 1 part | 1 part | 1 part |
| Hardness (Hs: JIS A) | 73 | 73 | 73 | 73 |
| Electric resistance (Ω) | $8 \times 10^4$ | $8 \times 10^4$ | $8 \times 10^4$ | $8 \times 10^4$ |
| Thickness (μm) | 10 | 10 | 10 | 10 |
| Outermost layer | | | | |
| Siliconegraftacrylic polymer | 100 parts | 100 parts | 100 parts | 100 parts |
| Kind | E | F | G | H |
| Glass-transition temperature | −15° C. | −30° C. | −35° C. | −15° C. |
| Number average molecular weight | 40,000 | 50,000 | 40,000 | 50,000 |
| $(Z)_n$ portion content | 60% | 30% | 30% | 30% |
| Denka Black HS-100 *2 | 10 parts | 10 parts | 10 parts | 10 parts |
| Hardener *3 | 10 parts | 10 parts | 10 parts | 10 parts |
| Electric resistance (Ω) | $5 \times 10^5$ | $8 \times 10^5$ | $2 \times 10^6$ | $1 \times 10^6$ |
| Thickness (μm) | 15 | 15 | 15 | 15 |

*1 X34-264 A/B manufactured by Shin-Etsu Chemical Co., Ltd.
*2 Manufactured by Denki Kagaku Kabushiki Kaisya.
*3 Coronate L manufactured by Nippon Polyurethane Industry Co., Ltd.

TABLE 3

| | Comparative Examples | | |
|---|---|---|---|
| | 1 | 2 | 3 |
| Innermost layer | | | |
| Conductive silicone rubber *1 | 100 parts | 100 parts | 100 parts |
| Hardness (Hs: JIS A) | 35 | 35 | 35 |
| Electric resistance (Ω) | $8 \times 10^4$ | $8 \times 10^4$ | $8 \times 10^4$ |
| Thickness (mm) | 5 | 5 | 5 |
| Intermediate layer | | | |
| H-NBR | 100 parts | 100 parts | 100 parts |
| Acrylonitrile amount (%) | 50 | 50 | 50 |
| Iodine value (mg/100 mg) | 23 | 23 | 23 |
| Stearic acid | 0.5 part | 0.5 part | 0.5 part |
| Zinc white (ZnO) | 5 parts | 5 parts | 5 parts |
| Denka Black HS-100 *2 | 30 parts | 30 parts | 30 parts |
| Vulcanization accelerator BZ | 1 part | 1 part | 1 part |
| Vulcanization accelerator CZ | 2 parts | 2 parts | 2 parts |
| Sulfur | 1 part | 1 part | 1 part |
| Hardness (Hs: JIS A) | 73 | 73 | 73 |
| Electric resistance (Ω) | $8 \times 10^4$ | $8 \times 10^4$ | $8 \times 10^4$ |
| Thickness (μm) | 10 | 10 | 10 |
| Outermost layer | | | |
| Ether type TPU *3 | 100 parts | — | — |
| Siliconegraftacrylic polymer | 5 parts | 100 parts | 100 parts |
| Kind | I | J | K |
| Glass-transition temperature | 60° C. | −40° C. | 35° C. |
| Number average molecular weight | 80,700 | 40,000 | 50,000 |
| $(Z)_n$ portion content | 30% | 30% | 30% |
| Denka Black HS-100 *2 | 10 parts | 10 parts | 10 parts |
| Hardener *4 | — | 10 parts | 20 parts |

TABLE 3-continued

| | Comparative Examples | | |
|---|---|---|---|
| | 1 | 2 | 3 |
| Electric resistance (Ω) | 7 × $10^5$ | 3 × $10^6$ | 5 × $10^6$ |
| Thickness (μm) | 15 | 15 | 15 |

*1 X34-264 A/B manufactured by Shin-Etsu Chemical Co., Ltd.
*2 Manufactured by Denki Kagaku Kabushiki Kaisya.
*3 Elastollan ET880 manufactured by Takeda Chemical Industries, Ltd.
*4 Coronate L manufactured by Nippon Polyurethane Industry Co., Ltd.

The conductive rolls thus obtained in Examples 1–8 and Comparative Examples 1–3 underwent comparative evaluations according to the following bases in terms of electric resistance of the roll, coefficient of friction, hardness, toner charge property, roll rotation torque, copied image quality and lastingness of the copied image quality. The results are shown in the following Tables 4–6.

[Electric resistance of the roll]

Figure 3A:
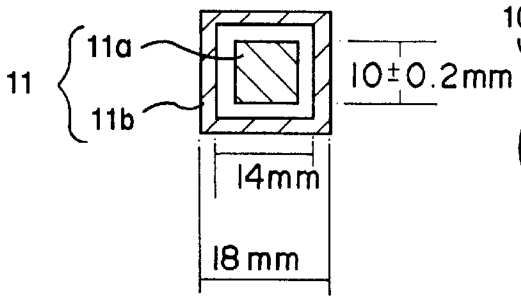
FIG. 3A shows a schematic view showing the shape of an electrode which is formed on the surface of a low hardness conductive roll when measuring electric resistance of the conductive roll, and FIG. 3B a schematic view showing a system of measurement of an electric resistance value of the conductive roll using the electrode.
Figure 3B:
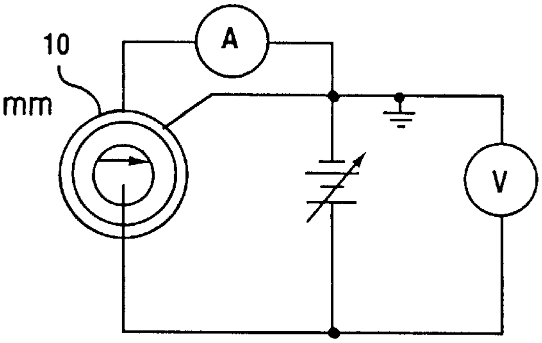

The electric resistance of the conductive roll was determined by measuring an applied voltage and an electric current, as shown in FIG. 3(A) and (B). Namely, 20 electrodes 11 having the shape shown in FIG. 3(A) were formed on the surface of a roll 10 shown in FIG. 3(B), and the system of measurement shown in FIG. 3(B) was adapted for measurement. In the figure, reference numeral 11*a* indicates a main electrode while reference numeral 11*b* indicates a guard electrode. The electric resistance shown in Examples and Comparative Examples was a median value of the measured values in 20 points. The applied voltage was 100 V.

[Coefficient of friction]

Figure 4:
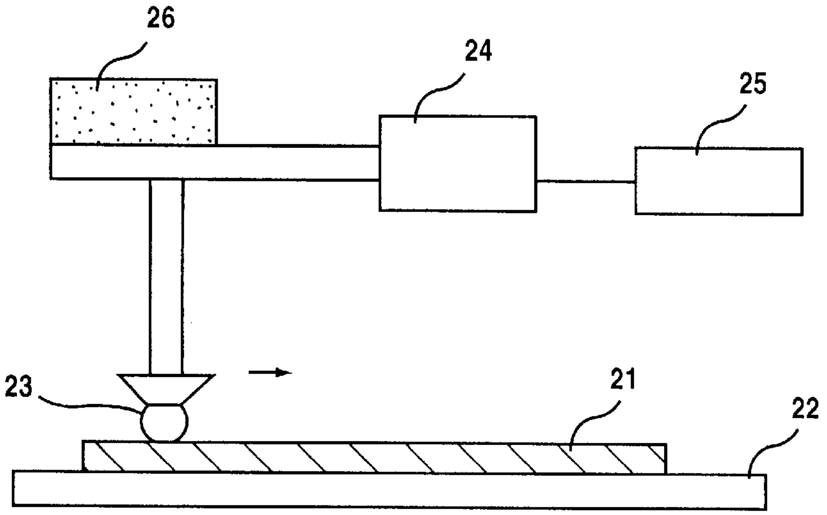
FIG. 4 is a schematic view showing a method of measuring coefficients of friction with a coefficient of static and dynamic friction analyzer.

The coefficient of friction was measured with a coefficient of static and dynamic friction analyzer (manufactured by Kyowa Interface Science Co., Ltd,) as shown in FIG. 4. Namely, a film 21 having a thickness of 50 to 100 μm was formed of a resin composition which is to form the outermost layer of a conductive roll. After setting the film 21 on a fixed board 22, the measurement was performed under the conditions of a 0.3 cm/min. moving speed and a 100 g load. In the figure, reference numeral 23 indicates a steel ball (having a 3 mm diameter), reference numeral 24 indicates a zero point adjustment balance, reference numeral 25 indicates a load cell and reference numeral 26 indicates a load (100 g).

[Hardness]

The conductive roll was measured in terms of hardness according to JIS A.

[Toner charge property]

Figure 5:
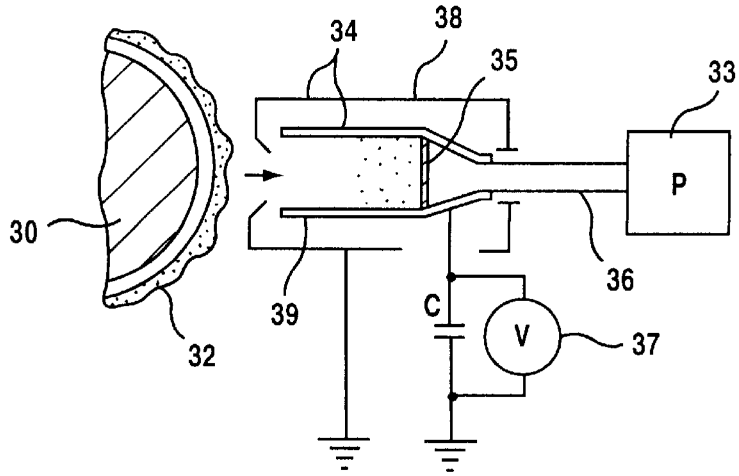
FIG. 5 is a schematic view showing a situation of measuring a toner charge amount according to the Faraday cage method.

The toner charge property was measured in the following manner under the condition of a 20° C.×50% RH charged amount. Namely, as shown in FIG. 5, a layer of a developing agent (toner) 32 was formed on the surface of a conductive roll 30, and the measurement was performed with a Faraday cage 34 by suctioning the developing agent 32 with a suction pump 33 (Faraday cage method). In the figure, reference numeral 35 indicates a filter, reference numeral 36 indicates an insulation pipe, reference numeral 37 indicates an electrometer, and reference numerals 38 and 39 indicate conductors which separate from each other.

[Roll rotation torque]

The conductive roll was pressure-contacted on a fixed photoreceptor, the conductive roll is rotated with a torque motor and the electric current value at start up was measured. The pressure when the conductive roll was pressure-contacted on the photoreceptor was determined in such a manner that the contacting portion of the conductive roll was indented at 0.3 mm in the direction of the diameter. The thus obtained measured values were calculated in terms of torque. The case where the calculated value was constantly below 3 kgf-cm was shown as ○, the case where the calculated value was below 3 kgf-cm although being, initially and the like, not less than 3 kgf-cm was shown as Δ, and the case where the calculated value was constantly not less than 3 kgf-cm was shown as X.

[Copied image quality]

The conductive roll was installed in an electrophotographic copying machine as a developing roll, and copying was performed under the condition of 20° C.×50% RH. The case where the density in a solid black image was sufficient and there was no image unevenness or an unprinted area of a white dot was shown as ○, and the case where there were insufficient density in a solid black image, image unevenness and/or an unprinted area of a white dot was shown as X.

[Lastingness of copied image quality]

The conductive roll was installed in an electrophotographic copying machine as a developing roll, and copying was performed under the condition of 20° C.×50% RH. After copying 3,000 sheets and 5,000 sheets, the case where the density in a solid black image was sufficient and there was no image unevenness or an unprinted area of a white dot was shown as ○, and the case where there were insufficient density in a solid black image, imago unevenness and/or an unprinted area of a white dot was shown as X.

TABLE 4

| | Examples | | | |
|---|---|---|---|---|
| | 1 | 2 | 3 | 4 |
| Electric resistance (Ω) | 1 × $10^6$ | 8 × $10^5$ | 5 × $10^6$ | 4 × $10^6$ |
| Coefficient of friction (μs) | 0.23 | 0.15 | 0.18 | 0.22 |
| Hardness (Hs: JIS A) | 40 | 42 | 40 | 38 |
| Toner charge property (μC/g) | −7.3 | −7.8 | −6.5 | −6.3 |
| Roll rotation torque | ○ | ○ | ○ | ○ |
| Copied image quality | ○ | ○ | ○ | ○ |
| Lastingness of copied 3,000 copies | ○ | ○ | ○ | ○ |
| image quality 5,000 copies | ○ | ○ | ○ | O |

TABLE 5

| | Examples | | | |
|---|---|---|---|---|
| | 5 | 6 | 7 | 8 |
| Electric resistance (Ω) | 2 × $10^6$ | 4 × $10^6$ | 7 × $10^6$ | 2 × $10^6$ |
| Coefficient of friction (μs) | 0.16 | 0.38 | 0.55 | 0.13 |
| Hardness (Hs: JIS A) | 40 | 37 | 35 | 40 |
| Toner charge property (μC/g) | −6.8 | −7.1 | −6.7 | −6.5 |
| Roll rotation torque | ○ | ○ | ○ | ○ |
| Copied image quality | ○ | ○ | ○ | ○ |
| Lastingness of copied 3,000 copies | ○ | ○ | ○ | ○ |
| image quality 5,000 copies | ○ | ○ | ○ | O |

TABLE 6

| | Comparative Examples | | |
|---|---|---|---|
| | 1 | 2 | 3 |
| Electric resistance (Ω) | 1 × $10^5$ | 8 × $10^6$ | 2 × $10^6$ |
| Coefficient of friction (μs) | 0.35 | 0.83 | 0.08 |

TABLE 6-continued

| | Comparative Examples | | |
|---|---|---|---|
| | 1 | 2 | 3 |
| Hardness (Hs: JIS A) | 40 | 36 | 53 |
| Toner charge property ($\mu$C/g) | −3.2 | −6.5 | −7.4 |
| Roll rotation torque | ○ | X | X |
| Copied image quality | ○ | ○ | X |
| Lastingness of copied 3,000 copies | ○ | ○ | X |
| image quality 5,000 copies | X | X | X |

From the results shown in Tables 4–6, it is known that the conductive rolls of Examples 1–8 have lower coefficients of friction and lower hardness, are more excellent in terms of toner charge property, have less roll rotation torque, and, further, are more excellent in terms of copied image quality and lastingness of copied image quality than the conductive rolls of Comparative Examples.

On the contrary, it is known that, regarding the conductive roll of Comparative Example 1, the toner charge property is inferior, a great deal of toner scattering occurs, and further toner filming and toner adherence occur after 5,000 copies, causing inferior image quality. Further, it is known that the conductive roll of Comparative Example 2 has a high coefficient of friction since the glass-transition temperature of the siliconegraftacrylic polymer used is below −35° C. As a result, the roll rotation torque becomes high and the image quality after 5,000 copies becomes inferior. Furthermore, it is known that the conductive roll of Comparative Example 3 uses the siliconegraftacrylic polymer whose glass-transition temperature exceeds 30° C., and therefore the hardness is high. As a result, the copied image quality becomes inferior and the lastingness of the copied image quality after 3,000 copies and 5,000 copies also becomes inferior.

EXAMPLES 9–16

Instead of the layer-forming materials shown in Tables 1 and 2, the materials shown in the following Tables 7 and 8 were used. Except for this change, the same procedures as those described hereinbefore were repeated so as to produce conductive rolls.

TABLE 7

| | Examples | | | |
|---|---|---|---|---|
| | 9 | 10 | 11 | 12 |
| Innermost layer | | | | |
| Conductive silicone rubber *1 | 100 parts | 100 parts | 100 parts | 100 parts |
| Hardness (Hs: JIS A) | 40 | 40 | 40 | 40 |
| Electric resistance (Ω) | $8 \times 10^4$ | $8 \times 10^4$ | $8 \times 10^4$ | $8 \times 10^4$ |
| Thickness (mm) | 5 | 5 | 5 | 5 |
| Intermediate layer | | | | |
| H-NBR | 100 parts | 100 parts | 100 parts | 100 parts |
| Acrylonitrile amount (%) | 50 | 50 | 40 | 40 |
| Iodine value (mg/100 mg) | 23 | 56 | 23 | 56 |
| Stearic acid | 0.5 part | 0.5 part | 0.5 part | 0.5 part |
| Zinc white (ZnO) | 5 parts | 5 parts | 5 parts | 5 parts |
| Denka Black HS-100 *2 | 30 parts | 30 parts | 30 parts | 30 parts |
| Vulcanization accelerator BZ | 1 part | 1 part | 1 part | 1 part |
| Vulcanization accelerator | 2 parts | 2 parts | 2 parts | 2 parts |

TABLE 7-continued

| | Examples | | | |
|---|---|---|---|---|
| | 9 | 10 | 11 | 12 |
| CZ | | | | |
| Sulfur | 1 part | 1 part | 1 part | 1 part |
| Hardness (Hs: JIS A) | 73 | 75 | 73 | 74 |
| Electric resistance (Ω) | $8 \times 10^4$ | $2 \times 10^4$ | $5 \times 10^4$ | $4 \times 10^4$ |
| Thickness ($\mu$m) | 10 | 10 | 10 | 10 |
| Outermost layer | | | | |
| Siliconegraftacrylic polymer | 100 parts | 100 parts | 100 parts | 100 parts |
| Kind | A | B | C | D |
| Glass-transition temperature | 0° C. | 30° C. | 0° C. | −15° C. |
| Number average molecular weight | 40,000 | 30,000 | 35,000 | 40,000 |
| $(Z)_n$ portion content | 30% | 30% | 50% | 11% |
| Denka Black HS-100 *2 | 10 parts | 10 parts | 10 parts | 10 parts |
| Hardener *3 | 10 parts | 10 parts | 20 parts | 20 parts |
| Electric resistance (Ω) | $1 \times 10^6$ | $2 \times 10^6$ | $5 \times 10^6$ | $3 \times 10^6$ |
| Thickness ($\mu$m) | 15 | 15 | 15 | 15 |

*1 X34-387 A/B manufactured by Shin-Etsu Chemical Co., Ltd.
*2 Manufactured by Denki Kagaku Kabushiki Kaisya.
*3 Burnock DN955 manufactured by Dainippon Ink and Chemicals Incorporated.

TABLE 8

| | Examples | | | |
|---|---|---|---|---|
| | 13 | 14 | 15 | 16 |
| Innermost layer | | | | |
| Conductive silicone rubber *1 | 100 parts | 100 parts | 100 parts | 100 parts |
| Hardness (Hs: JIS A) | 40 | 40 | 40 | 40 |
| Electric resistance (Ω) | $1 \times 10^5$ | $1 \times 10^5$ | $1 \times 10^5$ | $1 \times 10^5$ |
| Thickness (mm) | 5 | 5 | 5 | 5 |
| Intermediate layer | | | | |
| H-NBR | 100 parts | 100 parts | 100 parts | 100 parts |
| Acrylonitrile amount (%) | 44 | 44 | 36 | 36 |
| Iodine value (mg/100 mg) | 24 | 45 | 20 | 56 |
| Stearic acid | 0.5 part | 0.5 part | 0.5 part | 0.5 part |
| Zinc white (ZnO) | 5 parts | 5 parts | 5 parts | 5 parts |
| Denka Black HS-100 *2 | 30 parts | 30 parts | 30 parts | 30 parts |
| Vulcanization accelerator BZ | 1 part | 1 part | 1 part | 1 part |
| Vulcanization accelerator CZ | 2 parts | 2 parts | 2 parts | 2 parts |
| Sulfur | 1 part | 1 part | 1 part | 1 part |
| Hardness (Hs: JIS A) | 73 | 75 | 70 | 76 |
| Electric resistance (Ω) | $5 \times 10^4$ | $6 \times 10^4$ | $4 \times 10^5$ | $3 \times 10^4$ |
| Thickness ($\mu$m) | 10 | 10 | 10 | 10 |
| Outermost layer | | | | |
| Siliconegraftacrylic polymer | 100 parts | 100 parts | 100 parts | 100 parts |
| Kind | E | F | G | H |
| Glass-transition temperature | −15° C. | −30° C. | −35° C. | −15° C. |
| Number average molecular weight | 40,000 | 50,000 | 40,000 | 50,000 |
| $(Z)_n$ portion content | 60% | 30% | 30% | 30% |
| Denka Black HS-100 *2 | 10 parts | 10 parts | 10 parts | 10 parts |
| Hardener *3 | 10 parts | 10 parts | 20 parts | 20 parts |
| Electric resistance (Ω) | $5 \times 10^5$ | $8 \times 10^5$ | $2 \times 10^6$ | $1 \times 10^6$ |
| Thickness ($\mu$m) | 15 | 15 | 15 | 15 |

*1 X34-387 A/B manufactured by Shin-Etsu Chemical Co., Ltd.
*2 Manufactured by Denki Kagaku Kabushiki Kaisya.
*3 Coronate L manufactured by Nippon Polyurethane Industry Co., Ltd.

The conductive rolls thus obtained in Examples 9–16 underwent comparative evaluations according to the above-mentioned bases in terms of electric resistance of the roll, coefficient of friction, hardness, toner charge property, roll rotation torque, copied image quality and lastingness of the copied image quality. The results are shown in the following Tables 9 and 10.

TABLE 9

| | | Examples | | | |
|---|---|---|---|---|---|
| | | 9 | 10 | 11 | 12 |
| Electric resistance (Ω) | | $2 \times 10^6$ | $9 \times 10^5$ | $4 \times 10^6$ | $4 \times 10^6$ |
| Coefficient of friction (μs) | | 0.23 | 0.15 | 0.18 | 0.22 |
| Hardness (Hs: JIS A) | | 45 | 47 | 45 | 43 |
| Toner charge property (μC/g) | | −7.5 | −7.9 | −6.7 | −6.5 |
| Roll rotation torque | | ○ | ○ | ○ | ○ |
| Copied image quality | | ○ | ○ | ○ | ○ |
| Lastingness of copied | 3,000 copies | ○ | ○ | ○ | ○ |
| image quality | 5,000 copies | ○ | ○ | ○ | O |

TABLE 10

| | | Examples | | | |
|---|---|---|---|---|---|
| | | 13 | 14 | 15 | 16 |
| Electric resistance (Ω) | | $2 \times 10^6$ | $3 \times 10^6$ | $7 \times 10^7$ | $1 \times 10^6$ |
| Coefficient of friction (μs) | | 0.16 | 0.38 | 0.55 | 0.13 |
| Hardness (Hs: JIS A) | | 45 | 42 | 40 | 45 |
| Toner charge property (μC/g) | | −7.0 | −7.3 | −6.9 | −6.7 |
| Roll rotation torque | | ○ | ○ | ○ | ○ |
| Copied image quality | | ○ | ○ | ○ | ○ |
| Lastingness of copied | 3,000 copies | ○ | ○ | ○ | ○ |
| image quality | 5,000 copies | ○ | ○ | ○ | O |

From the results shown in Tables 9 and 10, the conductive rolls of Examples 9–16, like the conductive rolls of Examples 1–8, have low coefficients of friction and low hardness, are excellent in terms of toner charge property, have low roll rotation torque, and, further, are excellent in terms of copied image quality and lastingness of the copied image quality. Regarding the conductive roll of Example 15, since the acrylonitrile amount and the iodine value of H-NBR for the intermediate layer-forming material are low, the vulcanization of the intermediate layer is insufficient and the electric resistance becomes a little high. However, there is no problem in use as a conductive roll. Also, regarding the conductive roll of Example 16, since the acrylonitrile amount of H-NBR for the intermediate layer-forming material is low and the iodine value thereof is high, viscosity rises and shelf life of pigment deteriorates. However, there is no problem in use as a conductive roll.

Effect of the Invention

As described hereinbefore, since the outermost layer of the low hardness conductive roll according to the present invention is made of a specific resin composition containing a siliconegraftacrylic polymer of a specific structure having a specific glass-transition temperature, the toner charge property is excellent, toner scattering is low, and further the toner releasability is good so that filming of the toner does not tend to occur. As a result, toner adherence may be prevented while stable toner charge property for a long period of time may be achieved so that the image quality may be improved.

The low hardness conductive roll which is excellent in terms of flexibility and has a low coefficient of friction may be obtained by setting the molecular weight of the siliconegraftacrylic polymer (Component (A)) in the range from 10,000 to 300,000.

The conductivity of the low hardness conductive roll may further be improved by using a resin composition in which a conductive agent is further mixed, in addition to the siliconegraftacrylic polymer (Component (A)).

Regarding the low hardness conductive roll having a three-layer structure comprising an innermost layer, an intermediate layer and an outermost layer, when a specific resin composition containing the above Component (A) is used as the material to form the outermost layer while a material whose main constituent is a specific hydrogenated acrylonitrile-butadiene rubber (Component (B)) is used to form the intermediate layer, in addition to the above-described impartation of the good toner charge property and toner releasability, adhesive strength between the innermost/intermediate/outermost layers is improved, the occurrence of peeling, breaks and the like may be prevented, and good images may be obtained. Further, when a material whose main constituent is silicone rubber is used to form the innermost layer, low hardness with less compression set may be achieved.

What is claimed is:

1. A low hardness conductive roll comprising at least one layer formed on a peripheral surface of a shaft body, wherein an outermost layer of the at least one layer is formed of a resin composition containing the following Component (A):

(A) a siliconegraftacrylic polymer composed of a repetitive unit represented by the following general formula (1), wherein the glass-transition temperature of an acrylic polymer portion other than a structural portion derived from siloxane is in the range from −35 to 30° C.:

$$-(Y)_k- \quad -(Z)_n- \tag{1}$$

wherein Y denotes a linear structural portion derived from an acrylic monomer, Z denotes a structural portion derived from an acrylic monomer and also has a structural portion derived from siloxane, k denotes a positive number of 1 to 3,000, and n denotes a positive number of 1 to 3,000.

2. The low hardness conductive roll according to claim 1, wherein the siliconegraftacrylic polymer of Component (A) is composed of a repetitive unit represented by the following general formula (2):

$$-(Y)_k- \quad -(X)_m- \quad -(Z)_n- \tag{2}$$

wherein Y and X, which are different, denote linear structural portions derived from acrylic monomers, Z denotes a structural portion derived from an acrylic monomer and also has a structural portion derived from siloxane, k denotes a positive number of 1 to 3,000, mn denotes a positive number of 1 to 10,000, and n denotes a positive number of 1 to 3,000.

3. The low hardness conductive roll according to claim 1, wherein the number average molecular weight of the siliconegraftacrylic polymer of Component (A) is in the range from 10,000 to 300,000.

4. The low hardness conductive roll according to claim 1, wherein the percentage content of $(Z)_n$ portion in Component (A) is in the range from 5 to 60% by weight based on the whole weight of Component (A).

5. The low hardness conductive roll according to claim 1, wherein the resin composition forming the outermost layer comprises a conductive agent in addition to Component (A).

6. The low hardness conductive roll according to claim 1, wherein an innermost layer is formed on a peripheral surface of a shaft body, an intermediate layer is formed on a periphery of the innermost layer, and, further, an outermost layer is formed on a periphery of the intermediate layer, thereby producing a three-layer structure, and wherein the outermost layer is formed of the resin composition containing Component (A), and the intermediate layer is formed of a material whose main constituent is the following Component (B):

(B) a hydrogenated acrylonitrile-butadiene rubber in which the amount of acrylonitrile is in the range from 40 to 50% and the iodine value is in the range from 18 to 56 mg/100 mg.

7. The low hardness conductive roll according to claim 6, wherein the innermost layer is formed of a material whose main constituent is a silicone rubber.

8. The low hardness conductive roll according to claim 2, wherein the number average molecular weight of the siliconegraftacrylic polymer of Component (A) is in the range from 10,000 to 300,000.

9. The low hardness conductive roll according to claim 2, wherein the percentage content of $(Z)_n$ portion in Component (A) is in the range from 5 to 60% by weight based on the whole weight of Component (A).

10. The low hardness conductive roll according to claim 2, wherein the resin composition forming the outermost layer comprises a conductive agent in addition to Component (A).

11. The low hardness conductive roll according to claim 2, wherein an innermost layer is formed on a peripheral surface of a shaft body, an intermediate layer is formed on a periphery of the innermost layer, and, further, an outermost layer is formed on a periphery of the intermediate layer, thereby producing a three-layer structure, and wherein the outermost layer is formed of the resin composition containing Component (A), and the intermediate layer is formed of a material whose main constituent is the following Component (B):

(B) a hydrogenated acrylonitrile-butadiene rubber in which the amount of acrylonitrile is in the range from 40 to 50% and the iodine value is in the range from 18 to 56 mg/100 mg.

12. The low hardness conductive roll according to claim 11, wherein the innermost layer is formed of a material whose main constituent is a silicone rubber.

13. The low hardness conductive roll according to claim 3, wherein the percentage content of $(Z)_n$ portion in Component (A) is in the range from 5 to 60% by weight based on the whole weight of Component (A).

14. The low hardness conductive roll according to claim 3, wherein the resin composition forming the outermost layer comprises a conductive agent in addition to Component (A).

15. The low hardness conductive roll according to claim 3, wherein an innermost layer is formed on a peripheral surface of a shaft body, an intermediate layer is formed on a periphery of the innermost layer, and, further, an outermost layer is formed on a periphery of the intermediate layer, thereby producing a three-layer structure, and wherein the outermost layer is formed of the resin composition containing Component (A), and the intermediate layer is formed of a material whose main constituent is the following Component (B):

(B) a hydrogenated acrylonitrile-butadiene rubber in which the amount of acrylonitrile is in the range from 40 to 50% and the iodine value is in the range from 18 to 56 mg100 mg.

16. The low hardness conductive roll according to claim 15, wherein the innermost layer is formed of a material whose main constituent is a silicone rubber.

17. The low hardness conductive roll according to claim 4, wherein the resin composition forming the outermost layer comprises a conductive agent in addition to Component (A).

18. The low hardness conductive roll according to claim 4, wherein an innermost layer is formed on a peripheral surface of a shaft body, an intermediate layer is formed on a periphery of the innermost layer, and, further, an outermost layer is formed on a periphery of the intermediate layer, thereby producing a three-layer structure, and wherein the outermost layer is formed of the resin composition containing Component (A), and the intermediate layer is formed of a material whose main constituent is the following Component (B):

(B) a hydrogenated acrylonitrile-butadiene rubber in which the amount of acrylonitrile is in the range from 40 to 50% and the iodine value is in the range from 18 to 56 mg/100 mg.

19. The low hardness conductive roll according to claim 18, wherein the innermost layer is formed of a material whose main constituent is a silicone rubber.

20. The low hardness conductive roll according to claim 5, wherein an innermost layer is formed on a peripheral surface of a shaft body, an intermediate layer is formed on a periphery of the innermost layer, and, further, an outermost layer is formed on a periphery of the intermediate layer, thereby producing a three-layer structure, and wherein the outermost layer is formed of the resin composition containing Component (A), and the intermediate layer is formed of a material whose main constituent is the following Component (B);

(B) a hydrogenated acrylonitrile-butadiene rubber in which the amount of acrylonitrile is in the range from 40 to 50% and the iodine value is in the range from 18 to 56 mg/100 mg.

21. The low hardness conductive roll according to claim 20, wherein the innermost layer is formed of a material whose main constituent is a silicone rubber.

* * * * *